United States Patent [19]  [11] 4,265,802
Choe  [45] May 5, 1981

[54] POLYESTER OF PARA-HYDROXY BENZOIC ACID, 1,4-BIS(PARA-CARBOXYPHENOXY) BENZENE, AROMATIC DIOL AND AROMATIC DIACID CAPABLE OF UNDERGOING MELT PROCESSING

[75] Inventor: Eui W. Choe, Morris, N.J.

[73] Assignee: Celanese Corporation, New York, N.Y.

[21] Appl. No.: 109,573

[22] Filed: Jan. 4, 1980

[51] Int. Cl.$^3$ .................. C08G 63/60; C08G 63/66
[52] U.S. Cl. .................. 260/40 P; 260/40 R; 260/334 P; 528/173; 528/190; 528/193; 528/194; 528/271; 528/298; 528/360; 528/361
[58] Field of Search .............. 260/40 R, 40 P, 33.4 P; 528/173, 190, 193, 194, 271, 298, 360, 361

[56] References Cited

U.S. PATENT DOCUMENTS

| | | | |
|---|---|---|---|
| 3,884,876 | 5/1975 | Cottis et al. | 528/193 |
| 4,066,620 | 1/1978 | Kleinschuster et al. | 528/193 |
| 4,118,372 | 10/1978 | Schaefgen | 528/193 |
| 4,130,545 | 12/1978 | Calundann | 528/194 |

*Primary Examiner*—Lester L. Lee
*Attorney, Agent, or Firm*—Kenneth A. Genoni

[57] ABSTRACT

A novel polyester is provided which has been found to exhibit an optically anisotropic melt phase which enables it readily to undergo melt processing to form quality fibers, films, molded articles, etc. The polyester of the present invention contains recurring para-oxybenzoyl and para-phenylenedioxy-4,4'-dibenzoyl moieties in addition to moieties derived from at least one aromatic diol and at least one additional aromatic diacid in the proportions indicated. The hydrogen atoms present upon the aromatic rings derived from the aromatic diol and additional aromatic diacid optionally may be at least partially substituted (as described). The wholly aromatic polyester is capable of forming the desired anisotropic melt at a temperature below approximately 400° C., and in a preferred embodiment at a temperature below approximately 360° C.

26 Claims, No Drawings

POLYESTER OF PARA-HYDROXY BENZOIC ACID, 1,4-BIS(PARA-CARBOXYPHENOXY) BENZENE, AROMATIC DIOL AND AROMATIC DIACID CAPABLE OF UNDERGOING MELT PROCESSING

BACKGROUND OF THE INVENTION

Wholly aromatic polyester resins long have been known. For instance, 4-hydroxybenzoic acid homopolymer and copolymers have been provided in the past and are commercially available. Those wholly aromatic polyesters normally encountered in the prior art have tended to be somewhat intractable in nature and to present substantial difficulties if one attempts to melt process the same while employing conventional melt processing procedures. Such polymers commonly are crystalline in nature, relatively high melting or possess a decomposition temperature which is below the melting point, and when molten frequency exhibit an isotropic melt phase. Molding techniques such as compression molding or sintering may be utilized with such materials; however, injection molding, melt spinning, etc., commonly have not been viable alternatives or when attempted commonly have been accomplished with difficulty.

Representative publications which discuss wholly aromatic polyesters include: (a) *Polyesters of Hydroxybenzoic Acids*, by Russell Gilkey and John R. Caldwell, J. of Applied Polymer Sci., Vol. II, Pages 198 to 202 (1959), (b) *Polyarylates (Polyesters From Aromatic Dicarboxylic Acids and Bisphenols)*, by G. Bier, Polymer, Vol. 15, Pages 527 to 535 (August 1974), (c) *Aromatic Polyester Plastics*, by S. G. Cottis, Modern Plastics, Pages 62 to 63 (July 1975); and (d) *Poly(p-Oxybenzoyl Systems): Homopolymer for Coatings: Copolymers for Compression and Injection Molding*, By Roger S. Storm and Steven G. Cottis, Coatings Plast. Preprint, Vol. 34, No. 1, Pages 194 to 197 (April 1974). See also, U.S. Pat. Nos. 3,039,994; 3,169,121; 3,321,437; 3,553,167; 3,637,595; 3,651,014; 3,723,388; 3,759,870; 3,767,621; 3,778,410; 3,787,370; 3,790,528; 3,829,406; 3,890,256; and 3,975,487.

Also, it more recently has been disclosed that certain polyesters may be formed which exhibit melt anisotropy. See for instance, (a) *Polyester X7G-A Self-Reinforced Thermoplastic*, by W. J. Jackson Jr., H. F. Kuhfuss, and T. F. Gray Jr., 30th Anniversary Technical Conference, 1975 Reinforced Plastics/Composites Institute, The Society of the Plastics Industry, Inc., Section 17-D, Pages 1 to 4, (b) Belgian Pat. Nos. 828,935 and 828,936, (c) Dutch Pat. No. 7505551, (d) West German Nos. 2520819, 2520820, 2722120, 2834535, 2834536, and 2834537, (e) Japanese Nos. 43-223, 2132-116, 3017-692, and 3021-293, (f) U.S. Pat. Nos. 3,991,013; 3,991,014; 4,057,597; 4,066,620; 4,067,852; 4,075,262; 4,083,829; 4,118,372; 4,130,545; 4,130,702; 4,156,070; 4,159,365; 4,161,470; and 4,169,933; and (g) U.K. Application No. 2,002,404. See also commonly assigned U.S. Ser. Nos. 877,917, filed Feb. 15, 1978; (now U.S. Pat. No. 4,184,996) 17,007, filed Mar. 2, 1979; 21,050, filed Mar. 16, 1979; (now U.S. Pat. No. 422,433) 32,086, filed April 23, 1979; (now U.S. Pat. No. 4,219,461) and 54,049, filed July 2, 1979.

Additionally, see commonly assigned U.S. Ser. No. 10,392, filed Feb. 8, 1979 entited "Polyester of Para-Hydroxy Benzoic Acid, 1,2-Bis(Para Carboxy Phenoxy) Ethane, Terephthalic Acid and Substituted Hydroquinone Capable of Forming an Anisotropic Melt Which Readily Undergoes Melt Processing", and commonly assigned U.S. Ser. No. 10,393, filed Feb. 8, 1979, entitled "Polyester of Para-Hydroxy Benzoic Acid, 1,2-Bis(Para-Carboxyphenoxy)Ethane, Terephthalic Acid, and Hydroquinone Capable of Forming an Anisotropic Melt Which Readily Undergoes Melt Processing".

It is an object of the present invention to provide an improved melt processable wholly aromatic polyester which in at least some embodiments can be formed on a more economical basis than the polyesters of commonly assigned U.S. Ser. Nos. 10,392 and 10,393.

It is an object of the present invention to provide an improved melt processable wholly aromatic polyester which exhibits greater thermal stability, modulus and impact resistance than the polyesters of commonly assigned U.S. Ser. Nos. 10,392 and 10,393.

It is an object of the present invention to provide an improved wholly aromatic polyester which is suited for the formation of quality molded articles, melted extruded fibers, and melt extruded films.

It is an object of the present invention to provide an improved melt processable wholly aromatic polyester capable of forming an anisotropic melt phase at a temperature below approximately 400° C., and preferably below approximately 360° C.

It is an object of the present invention to provide an improved wholly aromatic polyester which forms a highly tractable melt phase.

It is an object of the present invention to provide an improved wholly aromatic polyester which forms an anisotropic melt phase at a temperature well below its decomposition temperature and which may form quality high performance fibers.

It is an object of the present invention to provide improved wholly aromatic polyester fibers which particularly are suited for use as fibrous reinforcement in a rubber matrix.

It is another object of the present invention to provide an improved wholly aromatic polyester which readily may be melt extruded to form a film.

It is another object of the present invention to provide an improved wholly aromatic polyester which readily may be injection molded to form a molded article (which optionally may be fiber reinforced).

These and other objects, as well as the scope, nature and utilization of the invention will be apparent to those skilled in the art from the following detailed description.

SUMMARY OF THE INVENTION

It has been found that a melt processable wholly aromatic polyester capable of forming an anisotropic melt phase at a temperature below approximately 400 ® C. consists essentially of the recurring moieties I, II, III, and IV wherein:

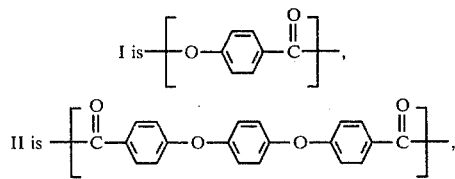

III is a dioxy aryl moiety of the formula $-[O-Ar-O]-$ where Ar is a divalent radical comprising at least one aromatic ring wherein at least one hydrogen atom present upon an aromatic ring optionally may be substituted with methyl, chloro, bromo, phenyl, alkoxy having 1 to 4 carbon atoms and mixtures of the foregoing, and IV is a dicarboxy aryl moiety of the formula

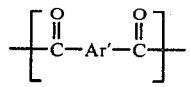

where Ar' is a divalent radical comprising at least one aromatic ring wherein at least one hydrogen atom present upon an aromatic ring optionally may be substituted with methyl, chloro, bromo, phenyl, alkoxy having 1 to 4 carbon atoms and mixtures of the foregoing, and wherein said polyester comprises approximately 30 to 60 percent of moiety I, approximately 10 to 30 mole percent of moiety II, approximately 20 to 35 mole percent of moiety III, and approximately 10 to 25 mole percent of moiety IV.

DESCRIPTION OF PREFERRED EMBODIMENTS

The wholly aromatic polyester of the present invention consists essentially of at least four recurring moieties which when combined in the polyester have been found to form an atypical optically anisotropic melt phase at a temperature below approximately 400° C., and preferably below approximately 360° C. (e.g., below 300° C. in a particularly preferred embodiment). Such aromatic polyester in most but not all embodiments of the present invention is crystalline in nature. The polymer melting temperatures may be confirmed by the use of a differential scanning calorimeter (i.e., DSC) employing repeat scans at a 20° C. per minute heat-up rate and observing the peak of the DSC melt transition. The crystalline polyester commonly exhibits a melting point of at least 250° C. and preferably of at least 260° C. as determined by differential scanning calorimetry. Because of its ability to exhibit anisotropic properties (i.e., liquid crystalline properties) in the melt, the polyester readily can form a product having a highly oriented molecular structure upon melt processing. Preferred polyesters are capable of undergoing melt processing at a temperature in the range of approximately 270° to 340° C. The usual difficulties incurred when one attempts to melt process aromatic polyesters by conventional melt processing techniques effectively are eliminated. The aromatic polyester is considered to be "wholly" aromatic in the sense that each moiety present in the same contributes at least one aromatic ring to the polymer backbone.

The wholly aromatic polyester comprises four essential moieties. Moiety I can be termed a paraoxybenzoyl moiety and possesses the structural formula:

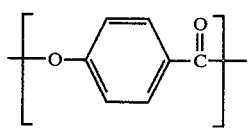

This moiety is relatively inexpensive and is derived from para-hydroxy benzoic acid and its derivatives.

Moiety I is present in a substantial concentration which comprises approximately 30 to 60 mole percent of the polyester. In a preferred embodiment moiety I is present in a concentration of approximately 35 to 50 mole percent of the polyester (e.g., approximately 40 mole percent of the polyester).

The second essential moiety (i.e., moiety II) is a particularly key component of the polyester and can be termed a para-phenylenedioxy-4,4'-dibenzoyl moiety and possesses the structural formula:

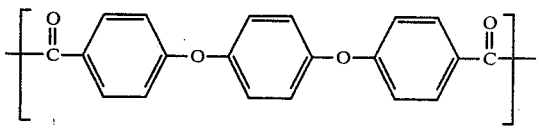

This moiety is relatively stiff in nature and in combination with the other moieties has been found to enable the polyester to exhibit desirable anisotropic properties in a relatively low viscosity melt phase. Moiety II is present in a concentration of approximately 10 to 30 mole percent of the polyester. In a preferred embodiment moiety II is present in a concentration of approximately 10 to 25 mole percent (e.g., approximately 15 mole percent of the polyester).

Moiety II can be derived from 1,4-bis(paracarboxyphenoxy)benzene which is sometimes termed paraphenylenedioxy-4,4'-dibenzoic acid. A suitable synthesis route for the production of 1,4-bis(para-carboxyphenoxy)benzene is reported by B. F. Malichenko, L. N. Vilenskaya and O. M. Voronina in Zurnal Organicheskoi Khimii, Vol. 7, No. 9, pp. 1924–26 (1971) which is hereby incorporated by reference. More specifically, a para-dihalobenzene such as paradichlorobenzene or para-dibromobenzene is reacted with potassium para-cresolate to obtain bis(para-methylphenyl)hydroquinone ether, and this ether compound is oxidized with potassium permanganate in a mixture of pyridine and water to form the desired 1,4-bis(para-phenylenedioxy)-4,4'-dibenzoic acid. Alternatively, the ether compound can be oxidized by other routes such as by an industrial oxidation technique whereby air and a suitable catalyst (e.g., a cobalt-containing catalyst) are employed.

The third essential moiety (i.e., moiety III) is a dioxy aryl moiety of the formula $-[O-Ar-O]-$ where Ar is a divalent radical comprising at least one aromatic ring wherein at least one hydrogen atom present upon an aromatic ring optionally may be substituted with methyl, chloro, bromo, phenyl, alkoxy having 1 to 4 carbon atoms, and mixtures of the foregoing. Moiety III preferably is symmetrical in the sense that the divalent bonds which join the moiety of other moieties in the main polymer chain are symmetrically disposed on one or more aromatic rings (e.g., are para to each other or diagonally disposed when present on a naphthalene ring). Moiety III comprises approximately 20 to 35 mole percent of the aromatic polyester, and preferably approximately 25 to 30 mole percent (e.g., approximately 30 mole percent). Preferred moieties which may serve as a symmetrical dioxy aryl moiety in the aromatic polyester of the present invention include:

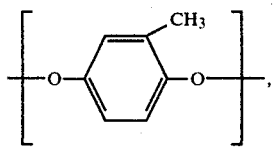

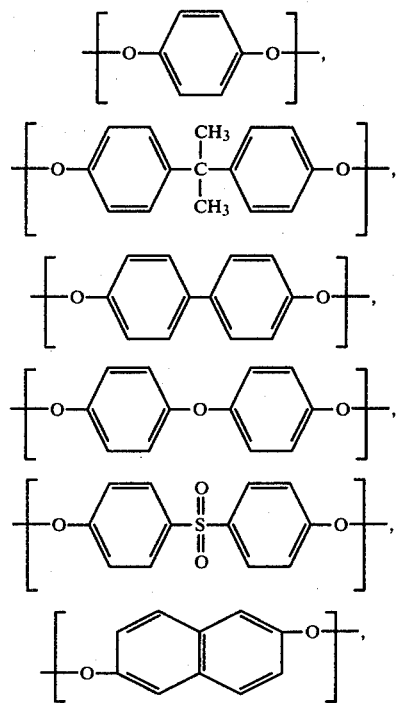

and mixtures of the foregoing. Highly satisfactory polymers can be formed wherein the aryl moiety is free of ring substitution. However, the presence of ring substitution tends to lower the melting point of the resulting polyester.

The particularly preferred dioxy aryl moieties are:

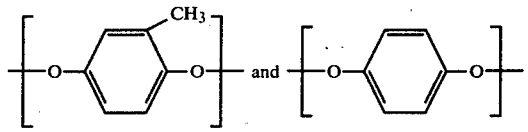

which readily may be derived respectively from methylhydroquinone and hydroquinone. Other representative examples of ring substituted compounds from which moiety III can be derived include chlorohydroquinone, bromohydroquinone, phenylhydroquinone, etc. An example of a non-symmetrical dixoy aryl moiety is that derived from resorcinol.

The fourth essential moiety (i.e., moiety IV) is a dicarboxy aryl moiety of the formula

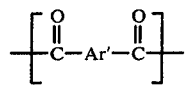

where Ar' is a divalent radical comprising at least one aromatic ring. Moiety IV preferably is symmetrical in the sense that the divalent bonds which join the moiety to other moieties in the main polymer chain are symmetrically disposed on one or more aromatic rings (e.g., are para to each other or diagonally disposed when present on a naphthalate ring). Moiety IV comprises approximately 10 to 25 mole percent of the aromatic polyester, and preferably approximately 10 to 15 mole percent (e.g., approximately 15 mole percent). Preferred moieties which may serve as a symmetrical dicarboxy aryl moiety in the aromatic polyester of the present invention include:

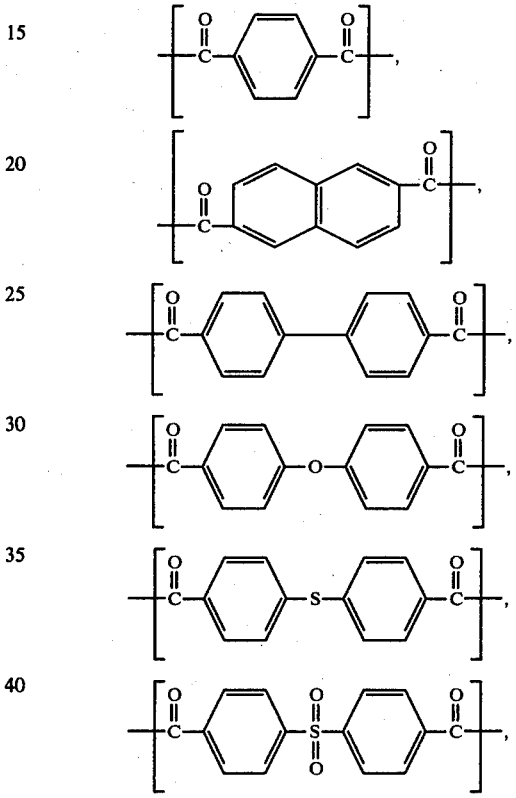

and mixtures of the foregoing.

The particularly preferred symmetrical dicarboxy aryl moiety is:

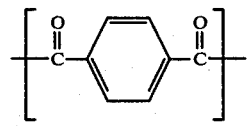

which readily may be derived from terephthalic acid. Minor concentrations (e.g., approximately 10 mole percent or less) of moieties derived from other aryl hydroxy acids (e.g., metahydroxy benozic acid, 6-hydroxy-2-naphthalic acid, etc.) optionally can be included in the wholly aromatic polyester. As will be apparent to those skilled in the art, the total molar quantities of dioxy units and dicarboxy units present within the wholly aromatic polyester will be substantially equal.

The wholly aromatic polyester of the present invention commonly exhibits

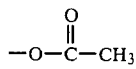

or

end groups depending upon the synthesis route selected. As will be apparent to those skilled in the art, the end groups optionally may be capped, e.g., acidic end groups may be capped with a variety of alcohols, and hydroxyl end groups may be capped with a variety of organic acids. For instance, end capping units such as phenylester

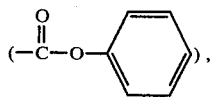

and methylester

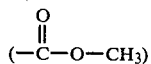

optionally may be included at the end of the polymer chains. The polymer also may be oxidatively crosslinked to at least some degree, if desired, by heating in an oxygen-containing atmosphere (e.g., in air) while in bulk form or as a previously shaped article at a temperature below its melting point for a limited period of time (e.g., for a few minutes).

The wholly aromatic polyester of the present invention tends to be substantially insoluble in all common polyester solvents, such as hexafluoroisopropanol and o-chlorophenol, and accordingly is not susceptible to solution processing. They can surprisingly be readily processed by common melt processing techniques as discussed hereafter. Most compositions are soluble to some degree in pentafluorophenol.

The wholly aromatic polyester of the present invention commonly exhibits a weight average molecular weight of about 2,000 to 200,000, and preferably about 10,000 to 50,000, e.g., about 20,000 to 25,000. Such molecular weight may be determined by standard techniques not involving the solutioning of the polymer, e.g., by end group determination via infra red spectroscopy on compression molded films. Alternatively, light scattering techniques in a pentafluorophenol solution may be employed to determine the molecular weight.

The wholly aromatic polyester prior to heat treatment additionally commonly exhibits an inherent viscosity (i.e., I.V.) of at least approximately 2.5 dl.g/., and preferably at least approximately 3.0 dl./g. (e.g., approximately 3.0 to 5.0 dl./g.) when dissolved in a concentration of 0.1 percent by weight in pentafluorophenol at 60° C.

The wholly aromatic polyesters of the present invention commonly may be considered crystalline in the sense that fibers melt extruded therefrom exhibit x-ray diffraction patterns using Ni-filtered CuK α radiation and flat plate cameras characteristic of polymeric crystalline materials. In those embodiments wherein aromatic ring substitution is present as previously described the polyesters may be substantially less crystalline in the solid phase and exhibit diffraction patterns typical of oriented amorphous fibers. In spite of the crystallinity commonly observed, the wholly aromatic polyester of the present invention nevertheless may be easily melt processed in all instances.

Unlike the aromatic polyesters commonly encountered in much of the prior art, the wholly aromatic polyester of the present invention is not intractable and forms an anisotropic melt phase whereby an atypical degree of order is manifest in the molten polymer. The subject polyester readily forms liquid crystals in the melt phase and accordingly exhibits a high tendency for the polymer chains to orient in the shear direction. Such anisotropic properties are manifest at a temperature which is amenable for melt processing to form shaped articles. Such order in the melt may be confirmed by conventional polarized light techniques whereby crossed polarizers are utilized. More specifically, the anisotropic melt phase may conveniently be confirmed by the use of a Leitz polarizing microscope at a magnification of 40X with the sample on a Leitz hot stage and under a nitrogen atmosphere. The polymer melt is optically anisotropic, i.e., it transmits light when examined between crossed polarizers. The amount of light transmitted increases when the sample is sheared (i.e., is made to flow), however, the sample is optically anisotropic even in the static state.

The wholly aromatic polyester of the present invention may be formed by a variety of ester-forming techniques whereby organic monomer compounds possessing functional groups which upon condensation form the requisite recurring moieties are reacted. For instance, the functional groups of the organic monomer compounds may be carboxylic acid groups, hydroxyl groups,, ester groups, acyloxy groups, acid halides, etc. The organic monomer compounds may be reacted in the absence of a heat exchange fluid via a melt acidolysis procedure. They, accordingly, may be heated initially to form a melt solution of the reactants wherein reactants such as terephthalic acid initially are present as solids with the reaction continuing as solid polymer particles are formed and suspended therein. A vacuum may be applied to facilitate removal of volatiles formed during the final stage of the condensation (e.g., acetic acid or water).

In commonly assigned U.S. Pat. No. 4,067,852 of Gordon W. Calundann, entitled "Improved Melt Processable Thermotropic Wholly Aromatic Polyester and Process for Its Production" is described a slurry polymerization process which may be employed to form the wholly aromatic polyester of the present invention wherein the solid product is suspended in a heat exchange medium. The disclosure of this copending application is herein incorporated by reference.

When employing either the melt acidolysis procedure or the slurry procedure of U.S. Pat. No. 4,067,852 the organic monomer reactants from which the para-oxybenzoyl moiety (i.e., moiety I), and the dioxy aryl moiety (i.e., moiety III), are derived may be initially provided in a modified form whereby the usual hydroxyl groups of these monomers are esterified (i.e., they are provided as acyl esters). For instance, lower acyl esters of para-hydroxy benzoic acid and hydroquinone, wherein the hydroxy groups are esterified may be provided as reactants. The lower acyl groups preferably have from about 2 to about 4 carbon atoms. Preferably the acetate esters of the organic compounds which form moieties I and III are provided. Accordingly, particularly preferred reactants for the condensation reaction are para-acetoxybenozoic acid and hydroquinone diacetate.

Representative catalysts which optionally may be employed in either the melt hydrolysis procedure or in the procedure of U.S. Pat. No. 4,067,852 include dialkyl tin oxide (i.e., dibutyl tin oxide), diaryl tin oxide, titanium dioxide, alkoxy titanium silicates, titanium alkoxides, alkali and alkaline earth metal salts of carboxylic acids (e.g., sodium acetate), the gaseous acid catalysts such as Lewis acids (e.g., $BF_3$), hydrogen halides (e.g., HCl), etc. The quantity of catalyst utilized typically is about 0.001 to 1 percent by weight based upon the total monomer weight, and most commonly about 0.01 to 0.2 percent by weight.

The molecular weight of a previously formed wholly aromatic polyester may be further increased via a solid state polymerization procedure wherein the particulate polymer is heated in an inert atmosphere (e.g., in a nitrogen atmosphere at a temperature of about 260° C. for 10 to 12 hours).

The wholly aromatic polyester of the present invention readily can be melt processed to form a variety of shaped articles, e.g., molded three-dimensional articles, fibers, films, tapes, etc. The polyester of the present invention is suited for molding applications and may be molded via standard injection molding techniques commonly utilized when forming molded articles. Unlike the wholly aromatic polyesters commonly encountered in the prior art it is not essential that more severe injection molding conditions (e.g., higher temperatures), compression molding, impact molding, or plasma spraying techniques be utilized. Fibers or films may be melt extruded.

A molding compound may be formed from the wholly aromatic polyester of the present invention which incorporates approximately 1 to 60 percent by weight (e.g., approximately 1 to 30 percent by weight) of a solid filler (e.g., talc) and/or reinforcing agent (e.g., glass fibers).

The wholly aromatic polyester also may be employed as a coating material which is applied as a powder or from a liquid dispersion.

When forming fibers and films the extrusion orifice may be selected from among those commonly utilized during the melt extrusion of such shaped articles. For instance, the shaped extrusion orifice may be in the form of a rectangular slit (i.e., a slit die) when forming a polymeric film. When forming a filamentary material the spinneret selected may contain one and preferably a plurality of extrusion orifices. For instance, a standard conical spinneret containing 1 to 2000 holes (e.g., 6 to 1500 holes) such as commonly used in the melt spinning of polyethylene terephthalate, having a diameter of about 1 to 60 mils (e.g., 5 to 40 mils) may be utilized. Yarns of about 20 to 200 continuous filaments are commonly formed. The melt-spinnable wholly aromatic polyester is supplied to the extrusion orifice at a temperature above its melting point, e.g., a temperature of about 270° to 340° C. in preferred embodiments, and a temperature of about 270° to 300° C. in some particularly preferred embodiments.

Subsequent to extrusion through the shaped orifice the resulting filamentary material or film is passed in the direction of its length through a solidification or quench zone wherein the molten filamentary material or film is transformed to a solid filamentary material or film. The resulting fibers commonly have a denier per filament of about 1 to 50, and preferably a denier per filament of about 1 to 20.

The resulting filamentary material or film optionally may be subjected to a thermal treatment whereby its physical properties are further enhanced. The tenacity of the fiber or film generally is increased by such thermal treatment. More specifically, the fibers or films may be thermally treated in an inert atmosphere (e.g., nitrogen, argon, helium or steam) or in a flowing oxygen-containing atmosphere (e.g., air) with or without stress at a temperature below the polymer melting point until the desired property enhancement is achieved. Thermal treatment times commonly range from a few minutes to several days. As the fiber is thermally treated, its melting temperature progressively is raised. The temperature of the atmosphere may be staged or continuously increased during the thermal treatment or held at a constant level. For instance, the fiber may be heated at 250° C. for one hour, at 260° C. for one hour, and at 270° C. for one hour. Alternatively, the fiber may be heated at about 10° to 30° C. below the temperature at which it melts for at least about 45 minutes (e.g., at 265° C. for three hours). Optimum heat threatment conditions will vary with the specific composition of the wholly aromatic polyester and with the fiber's process history.

The as-spun fibers formed from the wholly aromatic polyester of the present invention are fully oriented and exhibit highly satisfactory physical properties which render them suitable for use in high performance applications. Following thermal treatment (i.e., annealing) the fibers commonly exhibit an enhancement of the tenacity level exhibited by the as-spun fibers. The resulting fibers can be used with particular advantage as tire cords and in other industrial applications, such as conveyor belts, hose, cabling, resin reinforcement, etc. Films formed of the wholly aromatic polyester of the present invention may be used as strapping tape, cable wrap, magnetic tape, electric motor dielectric film, etc. The fibers and films exhibit an inherent resistance to burning.

The following examples are presented as specific illustrations of the claimed invention. It should be understood, however, that the invention is not limited to the specific details set forth in the examples.

EXAMPLE I

To a 300 ml. three-necked round bottom flask equipped with a mechanical stirrer, argon inlet and outlet, and a distillation head connected to a condenser are added the following:

(a) 36.03 grams of para-acetoxybenzoic acid (0.2 mole), (b) 26.28 grams of 1,4-bis(paracarboxyphenoxy) benzene (0.075 mole), (c) 32.27 grams of methyl hydroquinone diacetate (0.155 mole), and (d) 12.46 grams of terephthalic acid (0.075 mole).

The contents of the flask are heated under argon in accordance with the following heating schedule and pressure conditions: 260° C. for 30 minutes, 280° C. for 30 minutes, 300° C. for 75 minutes, 320° C. for 160 minutes under a reduced pressure of 5 to 10 Torr, and 340° C. for 30 minutes under a reduced pressure of 0.1 Torr. During the course of the reaction the acetic acid by-product is removed and is collected in the condenser. The polymer melt next is allowed to cool to ambient temperature (i.e., about 25° C.). Upon cooling, the polymer is finely ground in a Wiley Mill and is dried in a forced air oven at 110° C. for 60 to 70 minutes.

The inherent viscosity (I.V.) of the polymer is in excess of 2.5 dl./g. as determined in a pentafluorophenol solution of 0.1 percent by weight concentration at 60° C. in accordance with the formula:

$$I.V. = \ln (\eta \text{ rel})/c$$

where c=concentration of solution (0.1 percent by weight), and η rel=relative viscosity. When the polymer is subjected to differential scanning calorimetry (20° C./min. heating rate), it exhibits a melt endotherm of approximately 265° C. The polymer melt is optically anisotropic and is capable of readily undergoing melt processing.

The polymer melt can be micro-melt extruded into a continuous filament through a single hole spinneret having a diameter of 7 mils at approximately 285° C., and the extruded filament quenched in ambient air (i.e., at 72° F. and 65 percent relative humidity) prior to being taken-up at a rate of approximately 200 feet per minute. The tenacity of the as-spun filament can be further enhanced by heating in a nitrogen atmosphere at a temperature of about 265° C. for 3 hours. The fibrous product is suitable for use in high performance fiber applications and exhibits good thermal stability in addition to the required tenacity and modulus values. The product also exhibits a low degree of shrinkage at elevated temperatures and a good retention of tenacity and modulus at elevated temperatures.

EXAMPLE II

Example I is repeated with the exception that hydroquinone diacetate is substituted for methylhydroquinone diacetate during the formation of the polyester. The resulting polyester exhibits a melt endotherm of approximately 337° C. and is capable, inter alia, of being molded to form three-dimensional articles.

Although the invention has been described with preferred embodiments it is to be understood that variations and modifications may be employed without departing from the concept of the invention as defined in the following claims. I claim:

1. A melt processable wholly aromatic polyester capable of forming an anisotropic melt phase at a temperature below approximately 400° C. consisting essentially of the recurring moieties I, II, III, and IV wherein:

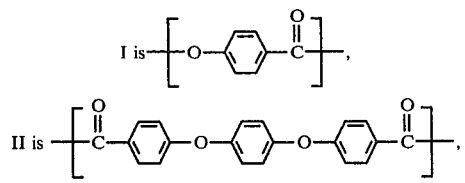

III is a dioxy aryl moiety of the formula $+O-Ar-O+$ where Ar is a divalent radical comprising at least one aromatic ring wherein at least one hydrogen atom present upon an aromatic ring optionally may be substituted with methyl, chloro, bromo, phenyl, alkoxy having 1 to 4 carbon atoms, and mixtures of the foregoing, and IV is a dicarboxy aryl moiety of the formula

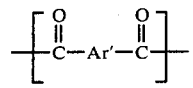

where Ar' is a divalent radical comprising at least one aromatic ring wherein at least one hydrogen atom present upon an aromatic ring optionally may be substituted with methyl, chloro, bromo, phenyl, alkoxy having 1 to 4 carbon atoms, and mixtures of the foregoing, and wherein said polyester comprises approximately 30 to 60 mole percent of moiety I, approximately 10 to 30 mole percent of moiety II, approximately 20 to 35 mole percent of moiety III, and approximately 10 to 25 mole percent of moiety IV.

2. A melt processable wholly aromatic polyester according to claim 1 which is capable of forming an anisotropic melt phase at a temperature below approximatey 360° C.

3. A melt processable wholly aromatic polyester according to claim 1 wherein said dioxy aryl moiety III and said dicarboxyl aryl moiety IV are symmetrically disposed.

4. A melt processable wholly aromatic polyester according to claim 1 wherein each moiety is substantially free of ring substitution.

5. A melt processable wholly aromatic polyester according to claim 1 wherein said dioxy aryl moiety III is selected from the group consisting of:

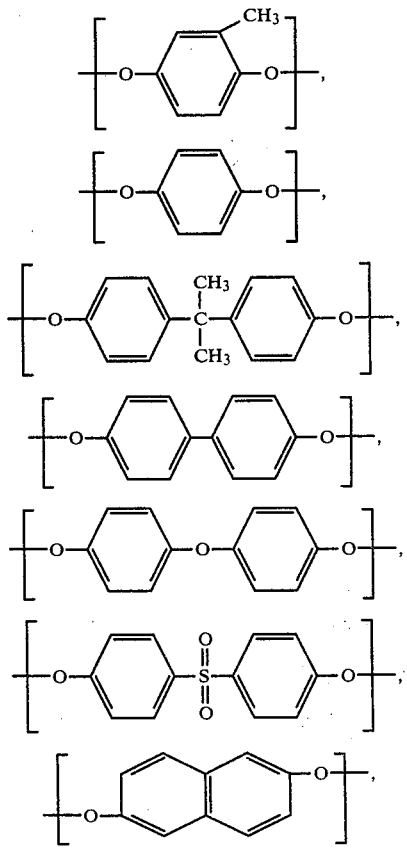

and mixtures of the foregoing.

6. A melt processable wholly aromatic polyester according to claim 1 wherein said dioxy aryl moiety III is

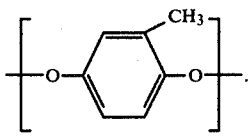

7. A melt processable wholly aromatic polyester according to claim 1 wherein said dioxy aryl moiety III is

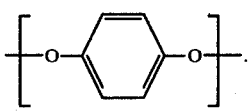

8. A melt processable wholly aromatic polyester according to claim 1 wherein said dicarboxy aryl moiety IV is selected from the group consisting of:

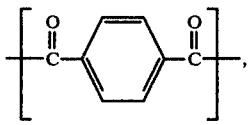

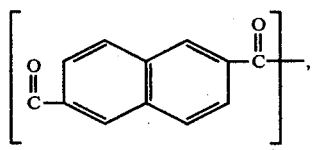

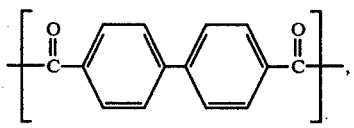

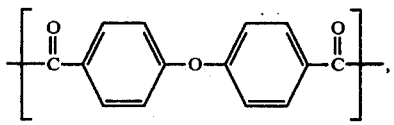

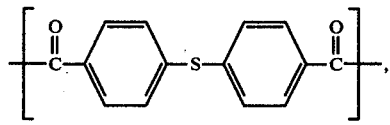

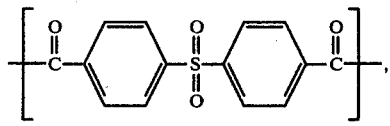

and mixtures of the foregoing.

9. A melt processable wholly aromatic polyester according to claim 1 wherein said dicarboxy aryl moiety IV is

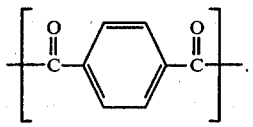

10. A melt processable wholly aromatic polyester according to claim 1 which comprises approximately 35 to 50 mole percent of moiety I, approximately 10 to 25 mole percent of moiety II, approximately 25 to 30 mole percent of moiety III, and approximately 10 to 15 mole percent of moiety IV.

11. A melt processable wholly aromatic polyester according to claim 1 which exhibits an inherent viscosity of at least 2.5 dl./g. when dissolved in a concentration of 0.1 percent by weight in pentafluorphenol at 60° C.

12. A melt processable wholly aromatic polyester according to claim 1 which exhibits an inherent viscosity of at least 3.0 dl./g. when dissolved in a concentration of 0.1 percent by weight in pentafluorophenol at 60° C.

13. A melt processable wholly aromatic polyester according to claim 1 which exhibits an inherent viscosity of 3.0 to 5.0 dl./g. when dissolved in a concentration of 0.1 percent by weight in pentafluorophenol at 60° C.

14. A fiber which has been melt spun from the wholly aromatic polyester of claim 1.

15. A film which has been melt extruded from the wholly aromatic polyester of claim 1.

16. A molded article comprising the melt processable wholly aromatic polyester of claim 1.

17. A molding compound comprising the melt processable wholly aromatic polyester of claim 1 which incorporates approximately 1 to 60 percent by weight of a solid filler and/or reinforcing agent.

18. A melt processable wholly aromatic polyester capable of forming an anisotropic melt phase at a temperature below approximately 360° C. consisting essentially of the recurring moieties I, II, III, and IV wherein:

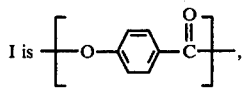

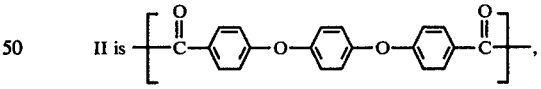

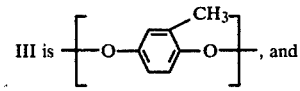

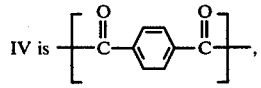

and wherein said polyester comprises approximately 30 to 60 mole percent of moiety I, approximately 10 to 30 mole percent of moiety II, approximately 20 to 35 mole percent of moiety III, and approximately 10 to 25 mole percent of moiety IV.

19. A melt processable wholly aromatic polyester according to claim 18 which comprises approximately 35 to 50 mole percent of moiety I, approximately 10 to 25 mole percent of moiety II, approximately 25 to 30 mole percent of moiety III, and approximately 10 to 15 mole percent of moiety IV.

20. A melt processable wholly aromatic polyester according to claim 18 which exhibits an inherent viscosity of at least 2.5 dl./g. when dissolved in a concentration of 0.1 percent by weight in pentafluorophenol at 60° C.

21. A melt processable wholly aromatic polyester according to claim 18 which exhibits an inherent viscosity of at least 3.0 dl./g. when dissolved in a concentration of 0.1 percent by weight in pentafluorophenol at 60° C.

22. A melt processable wholly aromatic polyester according to claim 18 which exhibits an inherent viscosity of 3.0 to 5.0 dl./g. when dissolved in a concentration of 0.1 percent by weight in pentafluorophenol at 60° C.

23. A fiber which has been melt spun from the wholly aromatic polyester of claim 18.

24. A film which has been melt extruded from the wholly aromatic polyester of claim 18.

25. A molded article comprising the melt processable wholly aromatic polyester of claim 18.

26. A molding compound comprising the melt processable wholly aromatic polyester of claim 18 which incorporates approximately 1 to 60 percent by weight of a solid filler and/or reinforcing agent.

* * * * *